United States Patent [19]

Ikari et al.

[11] Patent Number: 5,188,663
[45] Date of Patent: Feb. 23, 1993

[54] AQUATIC ANTIFOULING COMPOSITION

[75] Inventors: Hirotake Ikari, Ciba; Teruyoshi Takahashi, Kawaguchi, both of Japan

[73] Assignee: Rohm and Haas Company, Philadelphia, Pa.

[21] Appl. No.: 760,319

[22] Filed: Sep. 16, 1991

[51] Int. Cl.$^5$ ................................................ C09C 5/14
[52] U.S. Cl. ..................... 106/18.33; 106/15.05; 106/18.32; 106/18.34; 424/405; 514/445; 514/708; 514/709; 523/122; 548/213
[58] Field of Search .............. 106/15.05, 18.32, 18.33, 106/18.34; 424/405; 71/67; 514/445, 708, 709; 523/122; 548/213

[56] References Cited

U.S. PATENT DOCUMENTS

| | | | |
|---|---|---|---|
| 3,765,933 | 10/1973 | Lehureau et al. | 106/16 |
| 3,929,561 | 12/1975 | Shema et al. | 106/18.33 |
| 4,127,687 | 11/1978 | DuPont | 106/18.32 |
| 4,439,555 | 3/1984 | Doi et al. | 106/15.05 |

FOREIGN PATENT DOCUMENTS

| | | | |
|---|---|---|---|
| 2359188 | 2/1978 | France. | |
| 51-49227 | 4/1976 | Japan. | |
| 51-51517 | 5/1976 | Japan. | |
| 58-150577 | 9/1983 | Japan | 106/18.32 |
| 1575226 | 9/1980 | United Kingdom. | |

*Primary Examiner*—William R. Dixon, Jr.
*Assistant Examiner*—Anthony J. Green
*Attorney, Agent, or Firm*—Michael B. Fein

[57] ABSTRACT

An aquatic antifouling composition comprising (A) at least one 4-isothiazolin-3-one compound represented by the general formula:

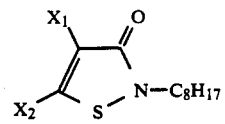

where $X_1$ and $X_2$ respectively represent a hydrogen atom or a halogen atom, and (B) at least one insoluble dithiocarbamic acid derivatives possessing a dithiocarbamyl group

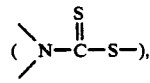

selected from the group consisting of divalent and higher heavy metal (zinc, manganese, copper, iron, and nickel) salts of ethylenebisdithiocarbamic acid, linear or branched propylenebisdithiocarbamic acid, linear or branched butylenebisdithiocarbamic acid, N-substituted ethylenebisdithiocarbamic acid, N,N'-substituted ethylenebisdithiocarbamic acid, N-substituted propylenebisdithiocarbamic acid, N,N'-substituted propylene-bisdithiocarbamic acid, N-substituted butylene-bisdithiocarbamic acid, and N,N'-substituted butylene-bisdithiocarbamic acid.

9 Claims, No Drawings

AQUATIC ANTIFOULING COMPOSITION

BACKGROUND OF THE INVENTION

1. Field of the Invention

This invention relates to an aquatic antifouling composition for preventing ship-bottoms, fishnets such as nursery nets and stationary nets, and other marine structures from being fouled or injured by marine adhesive livings.

2. Description of the Prior Art

Ships, specifically their bottoms and waterline zones, fishnets such as nursery nets and stationary nets, and other marine structures are subject to adhesion and parasitism of various marine organisms: they include animals such as barnacles, hydroides, ascidians, hard-shelled mussels and oysters, algae such as sea lettuce, green laver and marine-spirogyra, and various bacteria, molds and diatoms called slime. Their adhesion affects the ships and so forth seriously. A great cost is required for removal of these organisms and repairment or re-painting of the ships, etc.

In the case of a ship, for example, a several percent increase in the resistance of its hull due to the adhesion of such marine organisms causes a decrease in the speed and a fall in the fuel efficiency, which would result in a serious loss.

Recently the advance of ocean development in the coastal regions has been encouraging construction and installation of large marine structures, structures annexed thereto, and other similar structures. The structures exposed to sea water, for example, structures for harbor facilities such as nautical beacons, floating beacons, mooring buoys, floating piers, floating breakwaters, and floating docks, pipelines, bridges, tanks, water pipes in power stations, seaside industrial plants, mooring ships, mooring and floating fishing structures, fish preserving structures, and stationary nets and other structures for fishing facilities, suffer various damage such as corrosion in the basal parts, sinking due to the increased weight, loss of balance, etc. when the pollution-productive marine organisms have adhered and grown there.

At facilities, plants, and power stations located along seashores, when they use sea water for cooling or for the other purposes, the pollution-productive adhesive marine organisms adhere to their seawater inlets and outlets, coastal structures such as channels and culverts, and gain growth there. The volume occupied by these organisms at times reaches the order of some tens of percents of the inner volume of such tubular structures, which causes a decrease in the available cross-sectional area of waterways, an increase in the resistance to the liquid flow, choking of the screens to remove suspending solids, and so forth.

Fishnets such as nursery nets and stationary nets and marine ropes are subject to adhesion of such marine organisms as barnacles, hydroides, ascidians, green lavers and brown lavers. Since their adhesion impairs the economic use of such nets and ropes, great labor and large expense are required for the maintenance of such nets and ropes.

Heretofore, for the protection of marine structures from the adhesion of harmful marine organisms, sparingly soluble inorganic copper compounds, organic tin compounds, organic tin polymers, and organic nitrogen-sulfur compounds have been used.

These substances, however, have various drawbacks; some manifesting toxicity to men and beasts, others polluting environments, and yet others failing to maintain sufficient effect when used for a long time as an aquatic antifoulant. For example, organic tin compounds are highly effective in preventing the adhesion of marine organisms, and they have been regarded as efficient antifouling components and widely used. Recently, drawbacks of these organic tin compounds-being sparingly degradable, accumulation in living bodies, toxicological problem against men and beasts, possibility to cause environmental pollution-have been drawing attention.

Like organic tin compounds, dithiocarbamates which are organic sulfur compounds are also widely used as antifouling components. For example, Japanese Unexamined Patent Publication No. Sho 51-49227 discloses that adhesion of harmful marine organisms is prevented by coating fishnets with a composition obtained by combining manganese ethylenebisdithiocarbamate as an antifouling component with a vehicle. Also, Japanese Unexamined Patent Publication No. Sho 51-51517 discloses that adhesion of such harmful organisms is prevented by coating fishnets with an antifouling composition obtained by combining a heavy metal salt of ethylenebisdithiocarbamic acid, a cellulose resin and a vehicle.

As antifouling components against aquatic or marine organisms, organic tin compounds represented by tributyltin hydroxide, triphenyltin hydroxide and the like, tin-containing copolymers of such monomers as tributyltin (meth)acrylate, triphenyltin (meth)acrylate, bis(-tributyltin)fumarate and the like, tin-containing copolymers comprising the said monomers and vinyl monomers are considered most desirable in terms of retention of efficacy and stability of effect. However, use of them are almost forbidden because of their dangerous property against men and beasts, their possibility to cause environmental pollution and so forth.

In terms of safety to men and beasts and freedom from environmental pollution, metal salts of dithiocarbamic acid are rated as the most desirable antifouling components for antifoulants. In many cases, however, they are not satisfactory in terms of retention of efficacy and stability of effect. In order to solve these problems, a heavy metal salt of alkylenebisthiocarbamic acid is combined with an inorganic copper compound to prepare an antifouling component, or some other antifouling components such as organic tin compounds are added to the said combination. This practice, however, does not achieve satisfactory results. In the circumstances, an aquatic antifouling composition which is able to retain its effect long, which is sparingly susceptible to physical or chemical deterioration when coated, which is highly safe to men and beasts, and at the same time which is little liable to cause environmental pollution has been desired.

SUMMARY OF INVENTION

As a result of diligent studies, the present inventors have found that an aquatic antifouling composition which contains as effective antifouling components one or more kinds of 4-isothiazolin-3-one derivatives represented by the general formula:

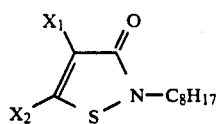

and one or more kinds of insoluble dithiocarbamic acid derivatives possessing a dithiocarbamyl group

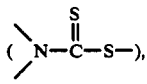

or an aquatic antifouling composition which contains as effective antifouling components one or more kinds of organic or inorganic copper compounds in addition to the above-mentioned compounds reveals extremely excellent antifouling effect compared to the conventional organic tin type antifoulants.

Concrete examples of the 4-isothiazolin-3-one derivative, one of the antifouling components of this invention, represented by the above-mentioned general formula include:
4,5-dichloro-2-n-octyl-4-isothiazolin-3-one,
4,5-dibromo-n-octyl-4-isothiazolin-3-one,
4-chloro-2-n-octyl-4-isothiazolin-3-one,
4-bromo-2-n-octyl-4-isothiazolin-3-one,
2-n-octyl-4-isothiazolin-3-one.

As concrete examples of the insoluble dithiocarbamic acidderivative possessing the dithiocarbamyl group

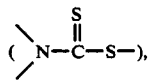

useful in the present invention, heavy metal salts of lower alkylenebisdithiocarbamic acids, metal-complexed heavy metal salts of lower alkylenebisdithiocarbamic acids, heavy metal salts of monofunctional lower alkyldithiocarbamic acids, heavy metal salts having lower alkylenebisdithiocarbamic acids bonded to monofunctional lower alkyldithiocarbamic acids through the medium of a heavy metal, and mixtures of the foregoing metal salts may be cited.

As examples of the heavy metal salts of a lower alkylenebisdithiocarbamic acid, divalent and higher heavy metal (zinc, manganese, copper, iron, and nickel) salts of ethylenebisdithiocarbamic acid, linear or branched propylenebisdithiocarbamic acid, linear or branched butylenebisdithiocarbamic acid, N-substituted ethylenebisdithiocarbamic acid, N,N'-substituted ethylenebisdithiocarbamic acid, N-substituted propylenebisdithiocarbamic acid, N,N'-substituted propylenebisdithiocarbamic acid, N-substituted butylenebisdithiocarbamic acid, and N,N'-substituted butylenebisdithiocarbamic acid may be cited.

The heavy metal salts of metal-complexed lower alkylenebisdithiocarbamic acids are those which are obtained by coordinating other metal atoms in the aforementioned heavy metal salts of lower alkylenebisdithiocarbamic acids. Representative examples of them include zinc-complexed manganese ethylenebisdithiocarbamate and copper-complexed ethylenebisdithiocarbamate.

As examples of the heavy metal salts of a monofunctional lower alkyldithiocarbamic acid, divalent and higher heavy metal (zinc, manganese, copper, iron, and nickel) salts of methyldithiocarbamic acid, dimethyldithiocarbamic acid, ethyldithiocarbamic acid, diethyldithiocarbamic acid, propyldithiocarbamic acid, dipropyldithiocarbamic acid, butyldithiocarbamic acid, and dibutyldithiocarbamic acid may be cited.

In addition to that, as examples of another kind of dithiocarbamate type compounds of the present invention, those metal salts which are formed by combining lower alkylenebisdithiocarbamic acids and monofunctional lower alkyldithiocarbamic acids through the medium of a heavy metal may be cited. They are produced by preparing mixed aqueous solutions of water-soluble salts of lower alkylenebisdithiocarbamic acids and water-soluble salts of monofunctional lower alkyldithiocarbamic acids and subjecting the mixed solutions to double decomposition with a water-soluble heavy metal salt. For the lower alkylenebisdithiocarbamic acid moiety and the monofunctional lower alkyldithiocarbamic acid moiety, those mentioned above may be cited. The most typical example of this dithiocarbamate type compound is the mixed salt (bisdimethyldithiocarbamoyl-zinc-ethylenebisdithiocarbamate) obtained by combining ethylenebisdithiocarbamic acid and dimethyldithiocarbamic acid through the medium of zinc. Generally, the products of this combination contain zinc dimethyldithiocarbamate, a heavy metal salt of a monofunctional lower alkyldithiocarbamic acid, and zinc ethylenebisdithiocarbamate, a heavy metal salt of a lower alkylenebisdithiocarbamic acid. These products are generally referred to as "polycarbamate agents."

The dithiocarbamate type compounds of the present invention can be effectively used in the form of physically mixed metal salts, as well as in the form of chemically mixed metal salts as described above. In the actual use, these compounds may be freely prepared in order to meet the particular place and time of use.

Concrete examples of the organic or inorganic copper compound, another antifouling component of the present invention, include basic copper carbonate, copper (II) chromate, copper (II) citrate, copper (II) ferrocyanate, copper (II) fluoride, copper (II) hydroxide, copper (II) quinoline, copper-8-hydroquinoline, copper (II) oleinate, copper (II) oxalate, copper (II) oxide, copper (II) phosphate, copper (II) stearate, copper (II) sulfide, copper (II) tartrate, copper (II) tungstate, copper (I) bromide, copper (I) iodide, copper (I) oxide, copper (I) sulfide, copper (I) sulfite, copper (I) thiocyanate, and copper naphthenate. One or more kinds of these compounds may be used.

The ratio of the 4-isothiazolin-3-one derivative(s) in the aquatic antifouling composition of this invention is 50 weight % or less, preferably 40 to 0.1 weight %. The ratio of the dithiocarbamic acid derivative(s) is 75 weight % or less, preferably 65 to 1 weight %. The ratio of the copper compound(s) is 70 weight % or less, preferably 60 to 0.1 weight %.

When these ratios exceed the upper limits, the coating operation would become difficult. On the other hand, if these ratios do not reach the lower limits, the antifouling effect against the aquatic or marine organisms would be insufficient.

Needless to say, the aquatic antifouling composition of this invention may be used in combination with such additives as organic or inorganic coloring pigments, conventional paints, extenders, suspending agents, antidripping agents, leveling agents, color fixing agents and UV absorbents. When in the form of a paint, said composition comprises a film forming latex polymer.

It is also possible to use the aquatic antifouling composition of this invention in combination with conventional antifoulants; for example, phthalimide type compounds such as trichlorophthalimide and the like, nitrile type compounds such as 2,4,5,6-tetrachloro-1,3-isophthalonitrile (Daconile) and the like, triazine type compounds such as 2-methylthio-4-t-butylamino-6-cyclopropylamino-S-triazine (Irgarol 1051) and the like, and 3-(3,4-dichlorophenyl)-1,1-dimethylurea (Zincpiridion) and the like.

Naturally, it is also possible to use the aquatic antifouling composition of this invention in combination with natural resins such as rosin or rosin ester, acryl type resins, alkyd type resins, epoxy type resins, vinyl type resins, vinyl chloride type resins and so forth.

For the solvent which is useful for the aquatic antifouling composition of this invention, xylene, toluene, solvent naphtha, methyl isobutyl ketone, methyl ethyl ketone, cellosolve and the like may be cited.

The antifouling composition of the present invention, when applied to ships (on their bottoms and waterline zones), fishnets such as nursery nets, stationary nets and marine ropes, structures for harbor installations, and oceanic structures such as pipelines and bridges, reveals excellent effect in preventing the adhesion of a wide variety of harmful organisms including animals such as barnacles, hydroides, ascidians, sea mussels and mussels; algae such as sea lettuce, green lavers, marine-spirogyras; and various bacteria, fungi, and diatoms collectively called "slime." This effect is maintained for a long time.

It has been known that dithiocarbamate compounds are highly effective in controlling bacteria and algae but their effect is insufficient against such animals as barnacles, hydroides, sea mussels and mussels. The antifouling composition of the present invention, however, has antifouling effect against a wide variety of these animals, bacteria, and algae.

The antifouling composition of this invention can be used in the same manner as the conventional antifouling composition. On ship-bottoms and marine structures, for example, the antifouling composition of the present invention is mixed with conventional coating materials or the like, and the mixture is coated on their surface by the conventional coating method. After the surface gets dry, they can be used. In the case of ropes and fishnets, they are dipped in the prepared antifouling composition, withdrawn from the composition, and then dried.

The antifouling composition of the present invention has extremely excellent antifouling effect compared to the conventional organic tin type antifouling compositions. And yet it is safe to men and beasts and does not cause environmental pollution or the like.

Now, the present invention will be described more specifically below with concrete examples and comparative experiments. It should be noted that this invention is not limited to these examples.

EXAMPLES

Testing Example 1

Test for Ship-bottom Antifouling Paints

Steel panels (300×100×2 mm) which had been given sandblast treatment were painted with Zinc Shop Primer once, with Vinyl Ship-bottom No. 1 Paint three times, and finally with one of the newly prepared ship-bottom antifouling paints shown in Tables 1 and 2 below three times. Then, they were dried for three days in a room.

The test panels thus obtained were hung on rafts which had been located at about 2 km offshore in Uragami Bay, Nachi Katsuura, Wakayama Prefecture. The panels were dipped in the sea 1.5 m below the surface. Then, the state of adhesion of marine organisms was observed for 24 months.

For the evaluation of effect, the following scale based on the area of adhesion (%) was used. The test results are shown in Tables 3 and 4.

| Scale | Area of adhesion with marine livings |
|---|---|
| 0 | No adhesion |
| 1 | 5% or less |
| 2 | 10% or less |
| 3 | 25% or less |
| 4 | 50% or less |
| 5 | more than 50% |

TABLE 1

| | Examples | | | | | | | | | | | | | | | | | | | | |
|---|---|---|---|---|---|---|---|---|---|---|---|---|---|---|---|---|---|---|---|---|---|
| | Concrete Example | | | | | | | | | | | | | Comparative Example | | | | | | | |
| Components | 1 | 2 | 3 | 4 | 5 | 6 | 7 | 8 | 9 | 10 | 11 | 12 | 13 | 1 | 2 | 3 | 4 | 5 | 6 | 7 | 8 |
| Baryta | 14 | 14 | 14 | 14 | 14 | 14 | 14 | 14 | 14 | 14 | 14 | 14 | 14 | 16 | 17 | 16 | 15 | 14 | 15 | 0 | 15 |
| Iron oxizde red | 10 | 10 | 10 | 10 | 10 | 10 | 10 | 10 | 10 | 10 | 10 | 10 | 10 | 13 | 14 | 13 | 11 | 10 | 11 | 0 | 12 |
| Talc | 10 | 10 | 10 | 10 | 10 | 10 | 10 | 10 | 10 | 10 | 10 | 10 | 10 | 12 | 13 | 12 | 10 | 10 | 10 | 0 | 12 |
| Rosin | 6 | 6 | 6 | 6 | 6 | 6 | 6 | 6 | 6 | 10 | 6 | 6 | 10 | 6 | 6 | 6 | 6 | 6 | 6 | 6 | |
| Vinyl acetate-vinyl chloride copolymer/VYHH | 6 | 6 | 6 | 6 | 6 | 6 | 6 | 6 | 6 | 6 | 6 | 6 | | 6 | 6 | 6 | 6 | 6 | 6 | 6 | |
| Rubber chloride/Goodyear (Priolight S-5B) | | | | | | | | | | | | | 4 | | | | | | | | |
| Tricresyl phosphate | 2 | 2 | 2 | 2 | 2 | 2 | 2 | 2 | 2 | 2 | 2 | 2 | 2 | 2 | 2 | 2 | 2 | 2 | 2 | 2 | 2 |
| Xylene | 16 | 16 | 16 | 16 | 16 | 16 | 16 | 16 | 16 | 18 | 16 | 16 | 18 | 16 | 16 | 16 | 16 | 16 | 16 | 17 | |
| Methyl isobutyl ketone | 20 | 20 | 20 | 20 | 20 | 20 | 20 | 20 | 20 | 16 | 20 | 20 | 16 | 20 | 20 | 20 | 20 | 20 | 20 | 18 | 18 |
| Anti-dripping agent/ Itoh Oil Co. (ASA-D-120) | 1 | 1 | 1 | 1 | 1 | 1 | 1 | 1 | 1 | 1 | 1 | 1 | 1 | 1 | 1 | 1 | 1 | 1 | 1 | 1 | 1 |
| 4,5-Dichloro-2-n-octyl-4-isothiazolin-3-one | | 8 | | 8 | 5 | 5 | | | | 2 | | 2 | 8 | 8 | 5 | | | | | | |
| 2-n-octly-4-isothiazolin-3-one | 8 | | 8 | | | 5 | 5 | 2 | | 2 | | | | | 8 | | | | | | |
| 5-Chloro-2-methyl-4-isothiazolin-3-one | | | | | | | | | | | | | | | | | | 5 | | | |
| Zinc salt of Dimethyldithiocarbamic acid | 7 | | | | 10 | | | 13 | | | | | | | | 13 | | | | | |
| Manganese salt of ethylenebis-dithiocarbamic acid | | 7 | | | 10 | 10 | | | 13 | | 7 | | | | | | 10 | | | | |
| Manganese salt of zinc-complexed ethylenebisdithiocarbamic acid | | | 7 | | | | | | | | 13 | | | | | | | | | | |
| Bisdimethyldithiocarbamoyl zinc | | | | 7 | | | 10 | | | 13 | | | | | | | 13 | | | | |

TABLE 1-continued

|  | Examples | | | | | | | | | | | | | | | | | | | | |
|---|---|---|---|---|---|---|---|---|---|---|---|---|---|---|---|---|---|---|---|---|---|
|  | Concrete Example | | | | | | | | | | | | | Comparative Example | | | | | | | |
| Components | 1 | 2 | 3 | 4 | 5 | 6 | 7 | 8 | 9 | 10 | 11 | 12 | 13 | 1 | 2 | 3 | 4 | 5 | 6 | 7 | 8 |
| ethylenebisdithiocarbamate | | | | | | | | | | | | | | | | | | | | | |
| Copper (I) oxide | | | | | | | | | | | | | | | | | | | | 50 | |
| Tributyl tin methacrylate copolymer/ Nitto Chemical S-100 (50% xylene) | | | | | | | | | | | | | | | | | | | | | 40 |

TABLE 2

|  | Examples | | | | | | | | | | | | | | |
|---|---|---|---|---|---|---|---|---|---|---|---|---|---|---|---|
|  | Concrete Example | | | | | | | | | | | Comparative Example | | | |
| Components | 14 | 15 | 16 | 17 | 18 | 19 | 20 | 21 | 22 | 23 | 24 | 9 | 10 | 11 | 12 |
| Baryta | 4 | 4 | 4 | 4 | 4 | 3 | 3 | 3 | 3 | 3 | 3 | 17 | 3 | 3 | 14 |
| Iron oxizde red | 3 | 3 | 3 | 3 | 3 | 3 | 3 | 3 | 3 | 3 | 3 | 12 | 3 | 3 | 10 |
| Talc | 3 | 3 | 3 | 3 | 3 | 3 | 3 | 3 | 3 | 3 | 3 | 11 | 3 | 3 | 10 |
| Rosin | 6 | 6 | 6 | 6 | 6 | 6 | 6 | 6 | 6 | 6 | 10 | 6 | 6 | 6 | 6 |
| Vinyl acetate-vinyl chloride copolymer/VYHH | 6 | 6 | 6 | 6 | 6 | 6 | 6 | 6 | 6 | 6 | 6 | 6 | 6 | 6 | 6 |
| Rubber chloride/Goodyear (Priolight S-503) | | | | | | | | | | | 4 | | | | |
| Tricresyl phosphate | 2 | 2 | 2 | 2 | 2 | 2 | 2 | 2 | 2 | 2 | 2 | 2 | 2 | 2 | 2 |
| Xylene | 16 | 16 | 16 | 16 | 16 | 16 | 16 | 16 | 16 | 16 | 18 | 16 | 16 | 16 | 16 |
| Methyl isobutyl ketone | 20 | 20 | 20 | 20 | 20 | 20 | 20 | 20 | 20 | 20 | 16 | 20 | 20 | 20 | 20 |
| Anti-dripping agent/ Itoh Oil Co. (ASA-D-120) | 1 | 1 | 1 | 1 | 1 | 1 | 1 | 1 | 1 | 1 | 1 | 1 | 1 | 1 | 1 |
| 4,5-Dichloro-2-n-octyl-4-isothiazolin-3-one | | 3 | | 3 | | | 5 | | 5 | | 5 | 9 | | | |
| 2-n-octly-4-isothiazolin-3-one | 3 | | 3 | | 3 | 5 | | 5 | | 5 | | | | | |
| 5-Chloro-2-methyl-4-isothiazolin-3-one | | | | | | | | | | | | | 5 | | |
| Zinc salt of Dimethyldithiocarbamic acid | 6 | | | | 5 | | | | | | | | | | |
| Zinc salt of ethylenebis-dithiocarbamic acid | | 6 | | | | | 5 | | | | | | | | |
| Manganese salt of ethylenebis-dithiocarbamic acid | | | 6 | | | | | 5 | | | 5 | 5 | | | |
| Manganese salt of zinc-complexed ethylenebisdithiocarbamic acid | | | | 6 | | | | | 5 | | | | | | |
| Bisdimethyldithiocarbamoyl zinc ethylenebisdithiocarbamate | | | | | 6 | | | | | 5 | | | | | |
| Copper (I) oxide | 30 | 30 | 30 | 30 | 30 | 30 | 30 | 30 | 30 | 30 | 30 | | 30 | 40 | |
| Tributyl tin fluoride/ Nitto Chemical Tributon F | | | | | | | | | | | | | | | 15 |

TABLE 3

|  | Evaluation of Area adhered by Marine Livings | | | | |
|---|---|---|---|---|---|
| No. of Months passed | 3 | 6 | 12 | 18 | 24 |
| Concrete Example | | | | | |
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |
| 5 | 0 | 0 | 0 | 0 | 0 |
| 6 | 0 | 0 | 0 | 0 | 0 |
| 7 | 0 | 0 | 0 | 0 | 0 |
| 8 | 0 | 0 | 0 | 0 | 1 |
| 9 | 0 | 0 | 0 | 1 | 2 |
| 10 | 0 | 0 | 0 | 0 | 1 |
| 11 | 0 | 0 | 0 | 1 | 1 |
| 12 | 0 | 0 | 0 | 0 | 1 |
| 13 | 0 | 0 | 0 | 0 | 0 |
| Comparative Example | | | | | |
| 1 | 0 | 0 | 1 | 2 | 4 |
| 2 | 0 | 1 | 2 | 4 | 5 |
| 3 | 0 | 0 | 1 | 3 | 5 |
| 4 | 0 | 1 | 2 | 3 | 5 |
| 5 | 0 | 1 | 2 | 3 | 4 |
| 6 | 0 | 1 | 3 | 4 | 5 |
| 7 | 0 | 1 | 3 | 5 | 5 |
| 8 | 0 | 1 | 2 | 3 | 4 |
| No Treatment | 5 | 5 | | | |

TABLE 4

|  | Evaluation of Area adhered by Marine Livings | | | | |
|---|---|---|---|---|---|
| No. of Months passed | 3 | 6 | 12 | 18 | 24 |
| Concrete Example | | | | | |
| 14 | 0 | 0 | 0 | 0 | 1 |
| 15 | 0 | 0 | 0 | 0 | 0 |
| 16 | 0 | 0 | 0 | 0 | 0 |
| 17 | 0 | 0 | 0 | 0 | 0 |
| 18 | 0 | 0 | 0 | 0 | 0 |
| 19 | 0 | 0 | 0 | 0 | 0 |
| 20 | 0 | 0 | 0 | 0 | 0 |
| 21 | 0 | 0 | 0 | 0 | 0 |
| 22 | 0 | 0 | 0 | 0 | 0 |
| 23 | 0 | 0 | 0 | 0 | 0 |
| 24 | 0 | 0 | 0 | 0 | 0 |
| Comparative Example | | | | | |
| 9 | 0 | 1 | 2 | 4 | 5 |
| 10 | 0 | 0 | 1 | 3 | 5 |
| 11 | 0 | 0 | 1 | 3 | 5 |

TABLE 4-continued

| No. of Months passed | Evaluation of Area adhered by Marine Livings | | | | |
|---|---|---|---|---|---|
| | 3 | 6 | 12 | 18 | 24 |
| 12 | 0 | 0 | 1 | 3 | 4 |
| No Treatment | 5 | 5 | | | |

Testing Example 2

Test for Fishnet Antifoulants

Polyethylene knotless net (5 knots 400 denier/70 pieces) was dipped in the fishnet antifoulants whose composition is shown in Table 5. After natural drying, the net was hung on rafts which had been located at about 2 km offshore in Uragami Bay, Katsuura, Wakayama Prefecture, and dipped in the sea 1.5 m below the surface. Then, the state of adhesion of marine organisms was observed for 6 months. The test results are shown in Table 6.

Scale for Evaluation

A: No adhesion of marine organisms
B: Some adhesion is observed, but the net can stand continuous use.
C: Fairly large volume of marine organisms are adhering, and the net is unfit for continuous use.
D: Enormous volume of marine organisms are adhering.

TABLE 5

| | Examples | | | | | | | | |
|---|---|---|---|---|---|---|---|---|---|
| | Concrete Example | | | | Comparative Example | | | | |
| Components | 25 | 26 | 27 | 28 | 13 | 14 | 15 | 16 | 17 |
| 4,5-Dichloro-2-n-octyl-4-isothiazolin-3-one | 10 | | 10 | | 15 | | | | |
| 2-n-Octyl-4-isothiazolin-3-one | | 10 | | 10 | | | | | |
| 5-Chloro-2-methyl-4-isothiazolin-3-one | | | | | | | | | 10 |
| Manganese ethylenebisdithiocarbamate | | 5 | 10 | | | | | | 10 |
| Bisdimethyldithio-carbamoyl zinc ethylenebisdithiocarbamate | 5 | | 10 | | 15 | | | | |
| Copper naphthenate | 5 | 5 | | | | | | 15 | 3 |
| Tributyl tin fluoride | | | | | | | | | 15 |
| Acrylic resin | 15 | 15 | 15 | 15 | 15 | 15 | 15 | 15 | 15 |
| Xylene | 65 | 65 | 65 | 65 | 70 | 70 | 70 | 67 | 65 |

TABLE 6

| No. of Months passed | Evaluation of Area adhered by Marine Livings | | | | | |
|---|---|---|---|---|---|---|
| | 1 | 2 | 3 | 4 | 5 | 6 |
| Concrete Example | | | | | | |
| 25 | A | A | A | A | A | B |
| 26 | A | A | A | A | A | B |
| 27 | A | A | A | A | B | B |
| 28 | A | A | A | A | B | B |
| Comparative Example | | | | | | |
| 13 | A | A | B | C | C | D |
| 14 | A | A | B | B | C | D |
| 15 | A | B | C | C | D | D |
| 16 | A | A | B | C | C | C |
| 17 | A | B | B | B | C | D |
| No Treatment | D | D | | | | |

EFFECT OF THE INVENTION

As described in detail, the aquatic antifouling composition of this invention has extremely excellent effect compared to the conventional organic tin type antifouling compositions. It is highly safe to men and beasts. According to this invention, the possibility to cause environmental pollution has been remarkably reduced.

We claim:

1. An aquatic antifouling composition comprising (A) at least one 4-isothiazolin-3-one compound represented by the general formula:

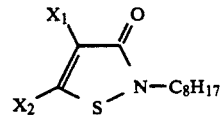

where $X_1$ and $X_2$ respectively represent a hydrogen atom or a halogen atom, and (B) at least one insoluble dithiocarbamic acid derivative possessing a dithiocarbamyl group

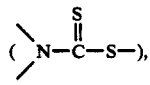

selected from the group consisting of divalent and higher heavy metal salts of ethylenebisdithiocarbamic acid, linear or branched propylenebisdithiocarbamic acid, linear or branched butylenebisdithiocarbamic acid, N-substituted ethylenebisdithiocarbamic acid, N,N'-substituted ethylenebisdithiocarbamic acid, N-substituted propylenebisdithiocarbamic acid, N,N'-substituted propylene-bisdithiocarbamic acid, N-substituted butylenebisdithiocarbamic acid, and N,N'-substituted butylenebisdithiocarbamic acid said (A) and (B) being present in an effective antifouling amount.

2. Composition according to claim 1 further including one or more kinds of organic or inorganic copper compounds.

3. Composition according to claim 1 wherein said 4-isothiazolin-3-one derivative is selected from the group consisting of one or more 4,5-dichloro-2-n-octyl-4-isothiazolin-3-one, 4,5-dibromo-n-octyl-4-isothiazolin-3-one, 4-chloro-2-n-octyl-4-isothiazolin-3-one, 4-bromo-2-n-octyl-4-isothiazolin-3-one, 2-n-octyl-4-isothiazolin-3-one.

4. Composition according to claim 2 wherein said copper compound is selected from the group consisting of basic copper carbonate, copper (II) chromate, copper (II) citrate, copper (II) ferrocyanate, copper (II) fluoride, copper (II) hydroxide, copper (II) quinoline, copper-8-hydroquinoline, copper (II) oleinate, copper (II) oxalate, copper (II) oxide, copper (II) phosphate, copper (II) stearate, copper (II) sulfide, copper (II) tartrate, copper (II) tungstate, copper (I) bromide, copper (I) iodide, copper (I) oxide, copper (I) sulfide, copper (I) sulfite, copper (I) thiocyanate, and copper naphthenate.

5. Composition according to claim 1 suitable as an antifouling paint further comprising a film-forming latex polymer.

6. Method of protecting an aquatic structure against fouling comprising applying an effective antifouling amount of a composition according to claim 1 to the structure.

7. Method according to claim 6 wherein said composition is a paint and further comprises a film-forming latex polymer.

8. Method according to claim 6 wherein said aquatic structure is a ship or a fishnet.

9. Composition according to claim 1 wherein said at least one insoluble dithiocarbamic acid derivative is a mixed salt (bisdimethyldithio-carbamoyl-zinc-ethylenebisdithiocarbamate) obtained by combining ethylenebisdithiocarbamic acid and dimethyldithiocarbamic acid through a medium of zinc.

* * * * *